(12) United States Patent
Gotfried

(10) Patent No.: US 6,819,248 B2
(45) Date of Patent: Nov. 16, 2004

(54) SYSTEM FOR PREVENTING ACCESS

(76) Inventor: Bradley L. Gotfried, 8949 SE. Bridge Rd., Hobe Sound, FL (US) 33455

( * ) Notice: Subject to any disclaimer, the term of this patent is extended or adjusted under 35 U.S.C. 154(b) by 0 days.

(21) Appl. No.: 10/283,743

(22) Filed: Oct. 30, 2002

(65) Prior Publication Data
US 2004/0085211 A1 May 6, 2004

(51) Int. Cl.[7] ............................................. G08B 23/00
(52) U.S. Cl. ...................................... 340/573.1; 340/576
(58) Field of Search ................................ 340/576, 632, 340/634, 5.1, 5.2, 5.31, 5.52; 73/23.2, 23.3; 307/10.6, 10.3

(56) References Cited

U.S. PATENT DOCUMENTS

| | | | |
|---|---|---|---|
| 3,794,796 A | 2/1974 | Dwan | |
| 3,903,726 A | 9/1975 | Hirosawa et al. | |
| 4,592,443 A | * 6/1986 | Simon | 180/272 |
| 4,613,845 A | 9/1986 | Du Bois | |
| 4,617,821 A | 10/1986 | Yokoyama et al. | |
| 4,697,666 A | * 10/1987 | Collier et al. | 180/272 |
| 5,020,628 A | 6/1991 | Bigliardi et al. | |
| 5,224,566 A | 7/1993 | Stepanian et al. | |
| 5,691,693 A | 11/1997 | Kithil | |
| 5,743,349 A | 4/1998 | Steinberg | |
| 6,026,674 A | 2/2000 | Gammenthaler | |
| 6,075,444 A | 6/2000 | Sohège et al. | |
| 6,620,108 B2 | * 9/2003 | Duval et al. | 600/532 |

* cited by examiner

Primary Examiner—John Tweel
(74) Attorney, Agent, or Firm—Akerman Senterfitt

(57) ABSTRACT

A system for preventing access to a vehicle. The system includes a substance detector configured to detect a level of at least one substance ingested by a user and a blocking device in communication with the substance detector where the blocking device disables the operability of at least one key. The blocking device enables the operability of the key when the level of the substance is measured by the substance detector to be within a predetermined range.

25 Claims, 12 Drawing Sheets

SYSTEM FOR PREVENTING ACCESS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention relates to systems for preventing access to sensitive machinery or areas and more particularly, to systems that prevent intoxicated persons from accessing keys to operate vehicles.

2. Description of Related Art

Driving under the influence of alcohol or other drugs is a major problem in the United States and many other countries. Although different agencies and organizations have attempted to curtail the occurrence of persons driving under the influence, many people continue to drive under the influence and continue to jeopardize the safety of others. In response to the safety concerns caused by intoxicated drivers, law enforcement agencies utilize reactive measures of administering field sobriety tests to drivers suspected of driving under the influence. While such a reactive measure may remove those intoxicated drivers who are stopped by law enforcement officials, other individuals who are not given field sobriety tests may continue to drive. Furthermore, reactive measures have an inherent flaw in that they only remove intoxicated drivers after such drivers have jeopardized the safety of others.

In an attempt to prevent driving under the influence, police departments and organizations have taken proactive measures to address the problem of driving under the influence. For example, speakers visit schools and community centers to educate the public regarding the legal ramifications and safety issues associated with driving under the influence. Additionally, some organizations utilize advertisements to help educate the public on the consequences of driving under the influence. Consequently, a portion of the general population has responded favorably by using taxis for transportation when intoxicated or by establishing a designated driver who will remain sober amongst a drinking group of people.

While these proactive measures help prevent widespread driving under the influence, the problem still remains. Thus, what is needed is a system that prevents a person who is under the influence from operating a vehicle while allowing individuals who are not under the influence to drive a vehicle on an unhindered basis.

SUMMARY OF THE INVENTION

The present invention concerns a system for preventing access to a vehicle. The system includes a substance detector configured to detect the level of at least one substance ingested by a user. The system also includes a blocking device that disables the operability of at least one key in communication with the substance detector. The blocking device enables the operability of the key when the level of the substance is measured by the substance detector to be within a predetermined range. In one arrangement, the blocking device can include a receiving portion. In this arrangement, the blocking device can disable the operability of the key when at least a portion of the key is placed in the receiving portion.

The blocking device can enable the operability of the key by exposing at least a portion of a functional region of the key. In one arrangement, the blocking device can include at least one track and at least one motor. In particular, the key can be slidably engaged to the track, and the motor can impart motion to the key such that the key slides along the track until at least a portion of the functional region of the key is exposed. In another arrangement, the blocking device can include a cover and a compartment in which the cover can be slidably engaged to the compartment. The blocking device can further include at least one motor for imparting motion to the cover such that the cover can slide along the compartment until at least a portion of the functional region of the key is exposed.

The substance detector can detect the level of the substance by analyzing a breath sample provided by a user. The substance detector can analyze the breath sample by measuring for a blood alcohol content. In one arrangement, the system can also include an alarm having at least one of a visual alarm and an audible alarm. The alarm can activate when the substance detector determines that the level of the substance is outside the predetermined range. The system can also include a user interface and a key holder for supporting a plurality of keys. Additionally, the key can include at least one of a magnetic element encoded with identifying information and a biometric identifier.

The invention also concerns a key system for preventing access to a secure area or a vehicle. The key system includes at least one key and a blocking device that includes a communication element in which the blocking device disables the operability of the key; the blocking device can enable the operability of the key when the communication element receives a first control signal. In one arrangement, the blocking device can further include a receiving portion in which the blocking device disables the operability of the key when at least a portion of the key is placed in the receiving portion, such that a functional region of the key is inaccessible. The blocking device can also include a securing portion in which the securing portion can be hingably coupled to the receiving portion and a lock, which can detachably fasten the securing portion to the receiving portion.

In another arrangement, a substance detector configured to detect a level of at least one substance ingested by a key operator can transmit the first control signal to the communication element. Further, the substance detector can transmit the first control signal when the substance detector determines that the substance level is within a predetermined range. The key system can also include an alarm having at least one of a visual alarm and an audible alarm. In one embodiment, the alarm can activate when the communication element receives a second control signal. Additionally, the key system can include a user interface and a key holder for supporting a plurality of keys. In yet another embodiment of the key system, the key can include at least one of a magnetic element encoded with identifying information and a biometric identifier. In another embodiment, the key system can include an ignition disabling device that can enable an ignition system when the substance detector determines that the substance level is within the predetermined range.

DETAILED DESCRIPTION OF THE PREFERRED EMBODIMENTS

Figure 1:
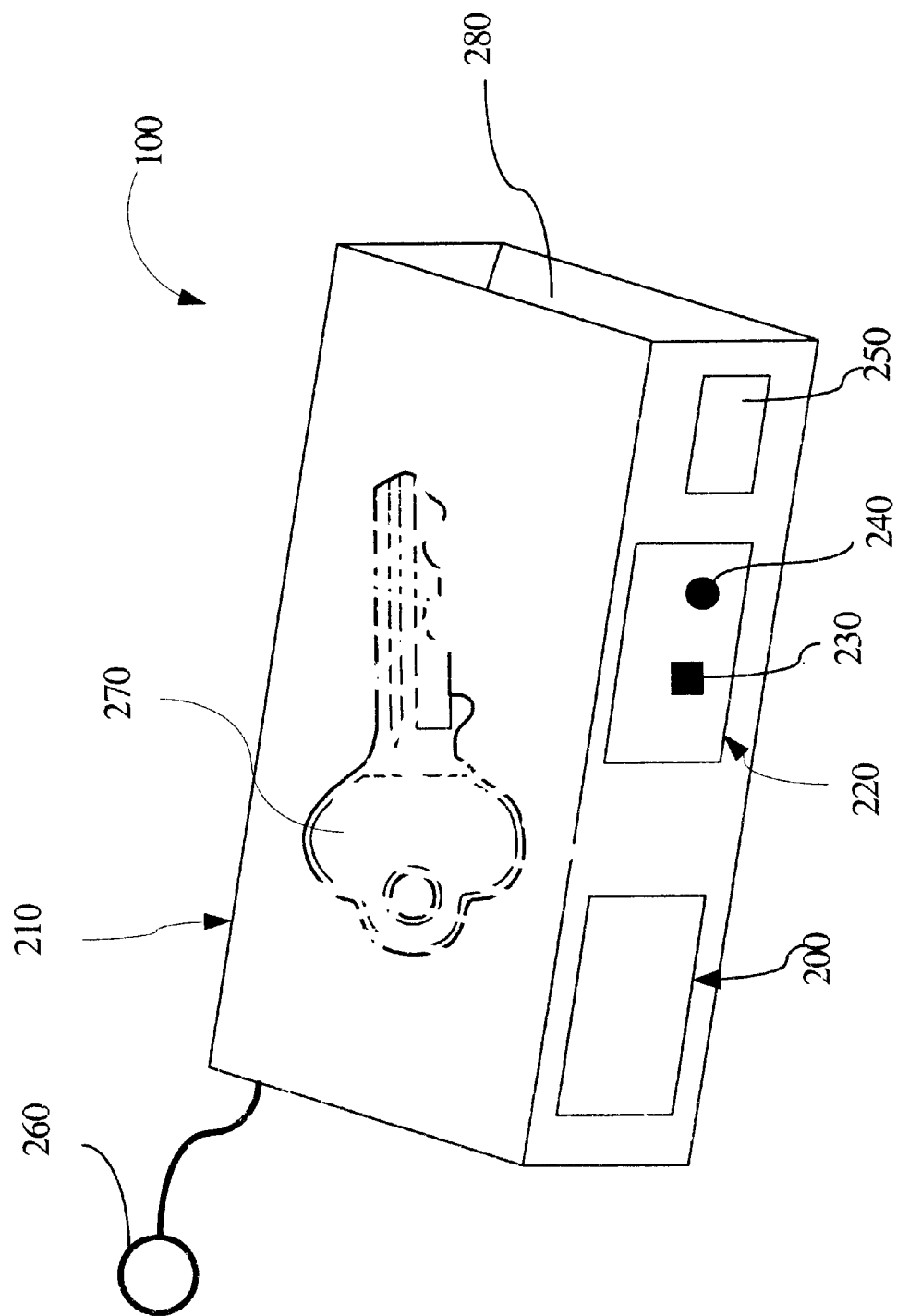
FIG. 1 illustrates a system for preventing access to a vehicle in which the system has disabled a key in accordance with the inventive arrangements.

FIG. 1 shows a system 100 for preventing access to a vehicle in accordance with the inventive arrangements. The system 100 can include a substance detector 200, a blocking device 210, an alarm 220, a user interface 250, and a key holder 260 having a metal or plastic ring suitable for holding keys. In one arrangement, the alarm 220 can have an audible alarm 230, a visible alarm 240, or a combination thereof. As an example, the visual alarm 240 can be a small lamp capable of emitting white light or any suitable type of colored light.

The blocking device 210 can disable at least one key 270. As illustrated in FIG. 1, the blocking device 210 can also include a receiving portion 280 adapted to receive at least a portion of the key 270. As an example, the receiving portion 280 can be any opening configured to accept at least a portion of the key 270. Once at least a portion of the key 270 is placed in the receiving portion 280, the blocking device 210 disables the key 270 because a user cannot access the key 270 for its functional use, such as engaging a lock or engaging an ignition system. In this illustration, the key 270 contains dashed outlines that represent that the key 270 is stored, i.e., disabled in the blocking device 210. Examples of how the blocking device 210 disables the key 270 will be discussed later.

The blocking device 210 can enable the key 270 when the substance detector 200 determines that the level of the substance is within a predetermined range. Specifically, the blocking device 210 can enable the key 270 by exposing at least a portion of the functional region 290 of the key 270. For purposes of this invention, the term "functional region" can include that portion of a key used to engage, for example, a lock or an ignition system.

Although the key 270 in FIG. 1 is a conventional key used to engage, for example, locks or ignition systems, the invention is not limited in this regard. As an example, the key 270 can be a key containing a magnetic element encoded with identifying information. Alternatively, the key 270 can include a biometric identifier, which can bar unauthorized individuals from using the key 270. As such, the term "functional region" can also include that portion of a key used to provide information or to gather information for purposes of authorizing its use. For example, a magnetic element encoded with identifying information or the biometric scanning plate of a biometric identifier can be considered the functional region of a key having such features. Examples of these types of keys will be described later.

Figure 2:
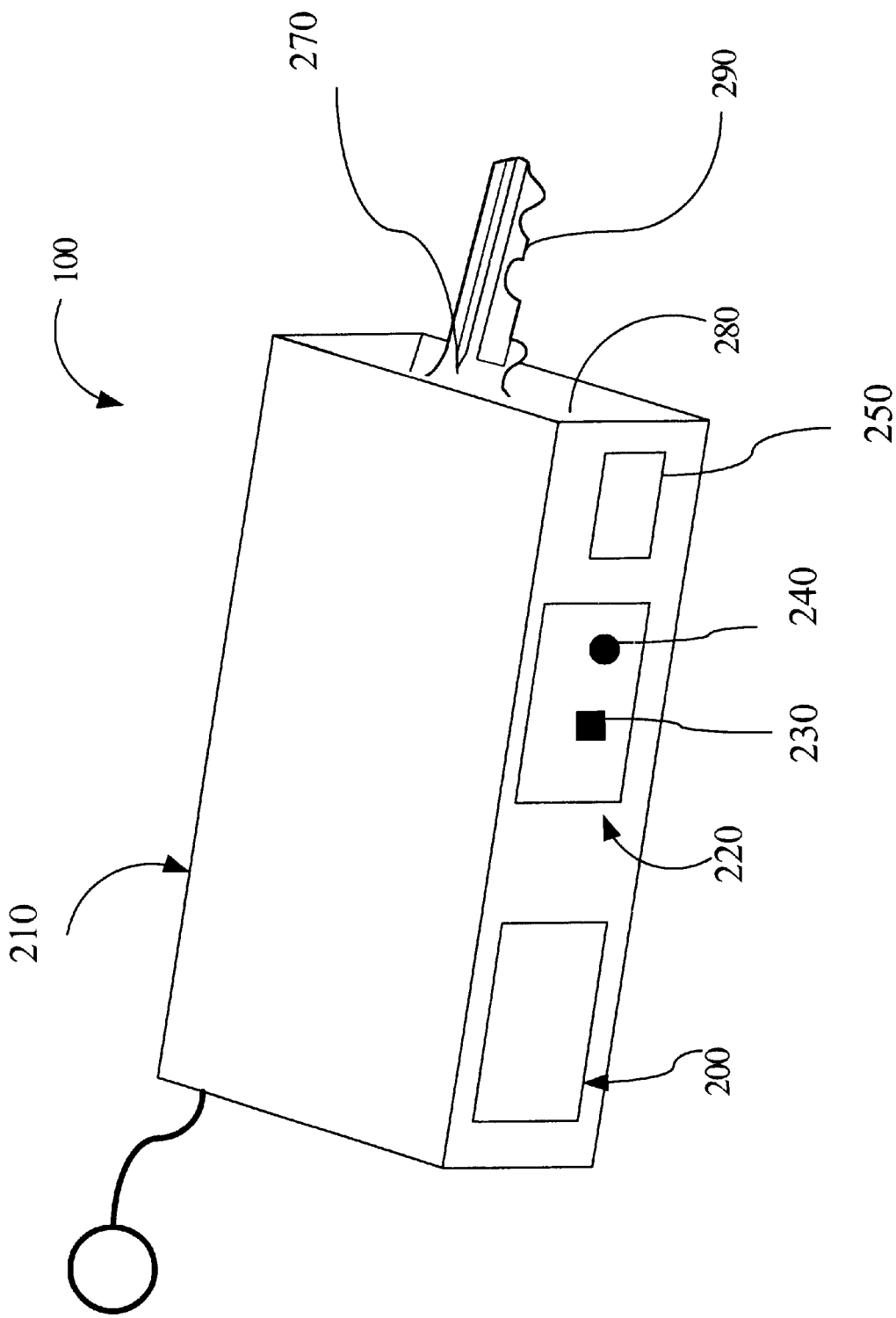
FIG. 2 illustrates a system for preventing access to a vehicle in which the system has enabled a key in accordance with the inventive arrangements.

Referring to FIG. 2, one example of how the blocking device 210 enables the key 270 is shown. In this example, once the substance detector 200 determines that the level of the substance is within the predetermined range, the blocking device 210 can enable the key 270 by causing the functional region 290 to be exposed beyond the receiving portion 280. Examples of how the blocking device 210 effects such a process will be described below.

It is understood that the invention is not limited to inhibiting access to a key 270, as the blocking device 210 can disable and selectively enable any other suitable article. For example, the blocking device 210 can prevent access to firearms or other sensitive equipment, releasing such items only if the substance detector 200 determines that the level of the substance is within the predetermined range. As another example, the blocking device 210 can be used to store sensitive documents.

Figure 3A:
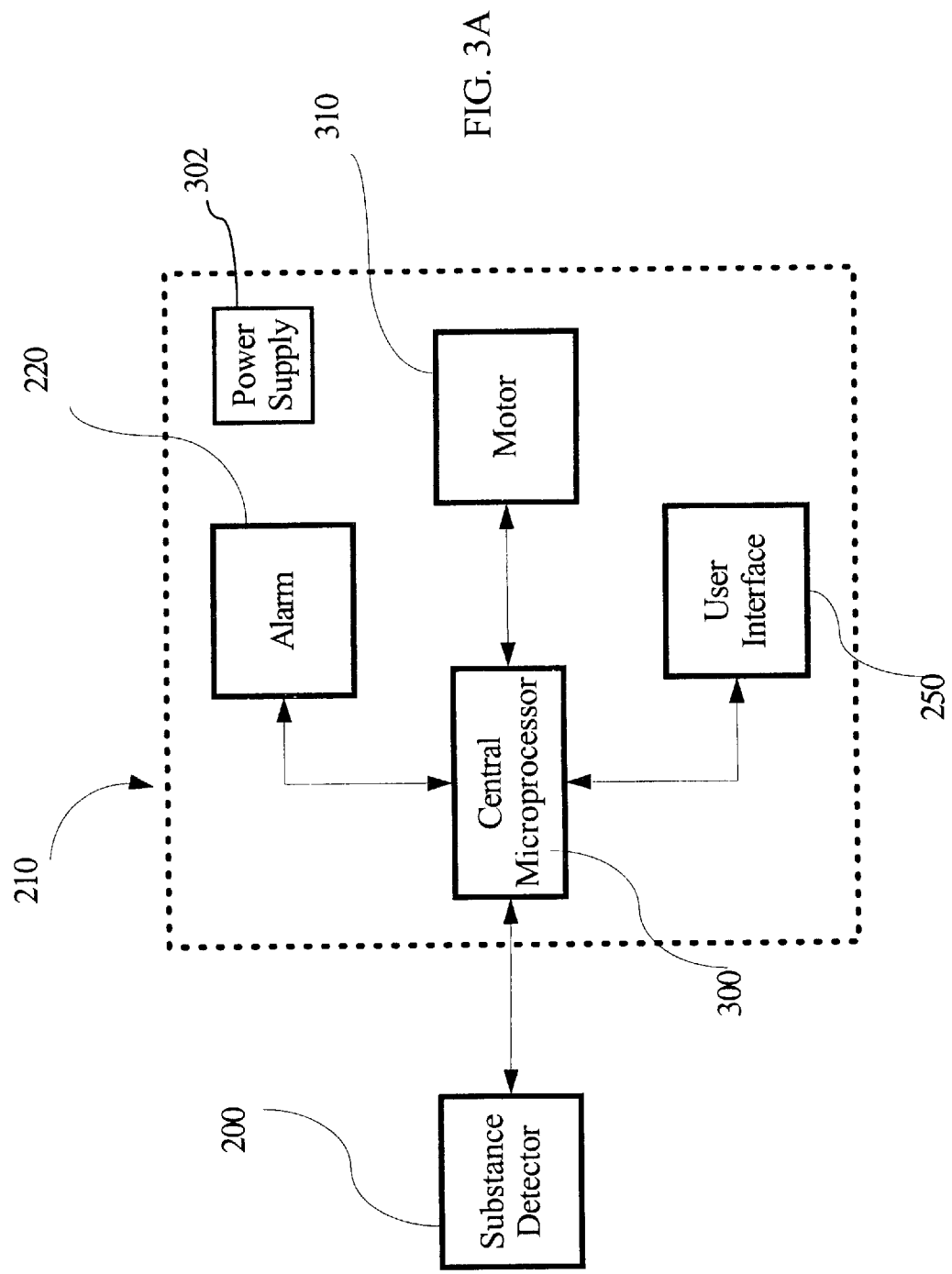
FIG. 3A illustrates a block diagram of several components of a system for preventing access to a vehicle in accordance with the inventive arrangements.

Referring to FIG. 3A, a block diagram showing many of the components of the system 100 is illustrated. In particular, the blocking device 210 can include all or portions of a central microprocessor 300, a power supply 302, the alarm 220, the user interface 250, and a motor 310. Furthermore, the substance detector 200, the alarm 220, the motor 310, and the user interface 250 can be electrically coupled to the central microprocessor 300 allowing signal communication between each of these components. Suitable software or firmware can be provided in memory for the conventional operations performed by the central microprocessor 300. Program routines can also be provided for the central microprocessor 300 in accordance with the inventive arrangements.

The substance detector 200 can detect a presence or a level of at least one substance ingested by a user and to transmit to the central microprocessor 300 a signal containing data concerning such detection. The blocking device 210 can respond accordingly if the substance is within or outside the predetermined range. In one arrangement, the substance detector 200 can detect the level of the substance by analyzing a breath sample provided by the user. As an example, the substance detector 200 can analyze the breath sample by measuring for a blood alcohol content. As a result, the predetermined range of the level of the substance can conform to the blood alcohol content legal limit within a particular jurisdiction such that if the level of the substance, i.e., alcohol, is above that jurisdiction's legal limit, the level of the substance is outside the predetermined range.

The invention, however, is not limited in this regard, as the predetermined range can be based on any suitable scale or measuring criteria used to detect a level of a substance ingested by a user. Substances ingested by a user can include any composition that a user brings into his or her body through inhalation, oral consumption, transdermal absorption, intravenous injection, or any other method.

Figure 3B:
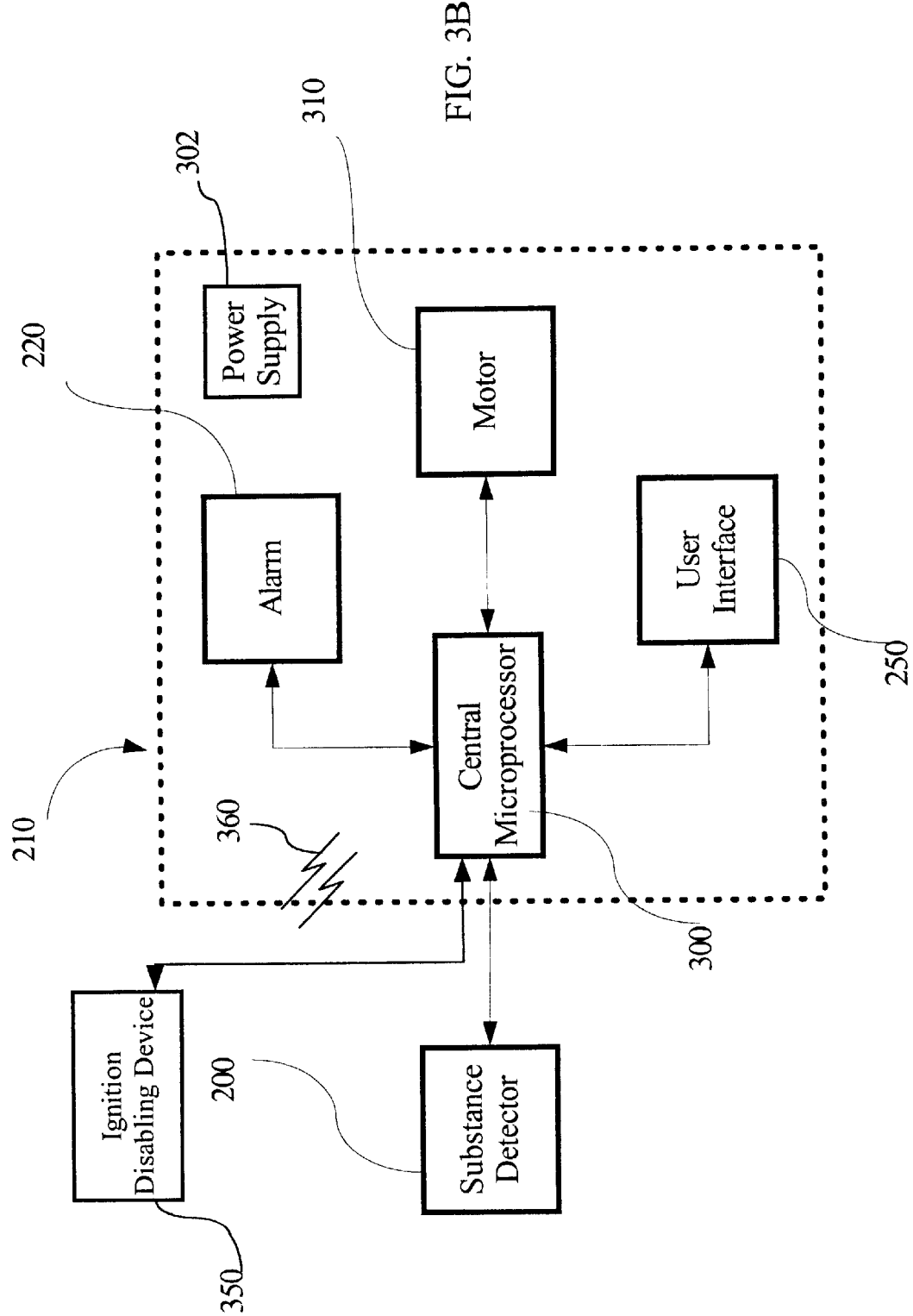
FIG. 3B illustrates an alternative of the block diagram of FIG. 3A in accordance with the inventive arrangements.

Referring to FIG. 3B, the system 100 can also include an ignition disabling device 350. The system 100 can include control and data interfaces for coupling the ignition disabling device 350 to the central microprocessor 300. In another arrangement, the ignition disabling device 350 and the central microprocessor 300 can include suitable circuitry for permitting wireless communication between both of these components over a wireless communication link 360. The wireless communication link 360 can use any suitable radio frequency (RF) for the transmission of data. As defined herein, RF means any electromagnetic wave that can be propagated wirelessly through a suitable medium. The central microprocessor 300 can signal the ignition disabling device 350 based on measurements provided by the substance detector 200.

The ignition disabling device 350 can be used to selectively enable an ignition system (not shown) when the level of the substance is measured by the substance detector 200 to be within the predetermined range. In particular, the ignition disabling device 350 can disable the ignition system, necessitating a signal from the central microprocessor 300 to enable the ignition system. If the level of the substance as measured by the substance detector 200 is within the predetermined range indicating that the user is not impaired, the central microprocessor 300 can signal the ignition disabling device 350 to enable the ignition system, thereby allowing the user to operate the ignition system.

Conversely, the ignition system can also remain disabled and prevent an impaired user from operating the ignition system. For example, if the level of the substance is measured by the substance detector 200 to be outside the predetermined range indicating that the user is impaired, the ignition disabling device 350 will not enable the ignition system, thereby preventing the impaired user from operating the ignition system. The invention is not limited in this regard, however, as the ignition disabling device 350 can also receive signals from the central microprocessor 300 to disable the ignition system based on measurements by the substance detector 200. The process of how the ignition disabling device 350 can enable and disable an ignition system will be discussed later.

Figure 4A:
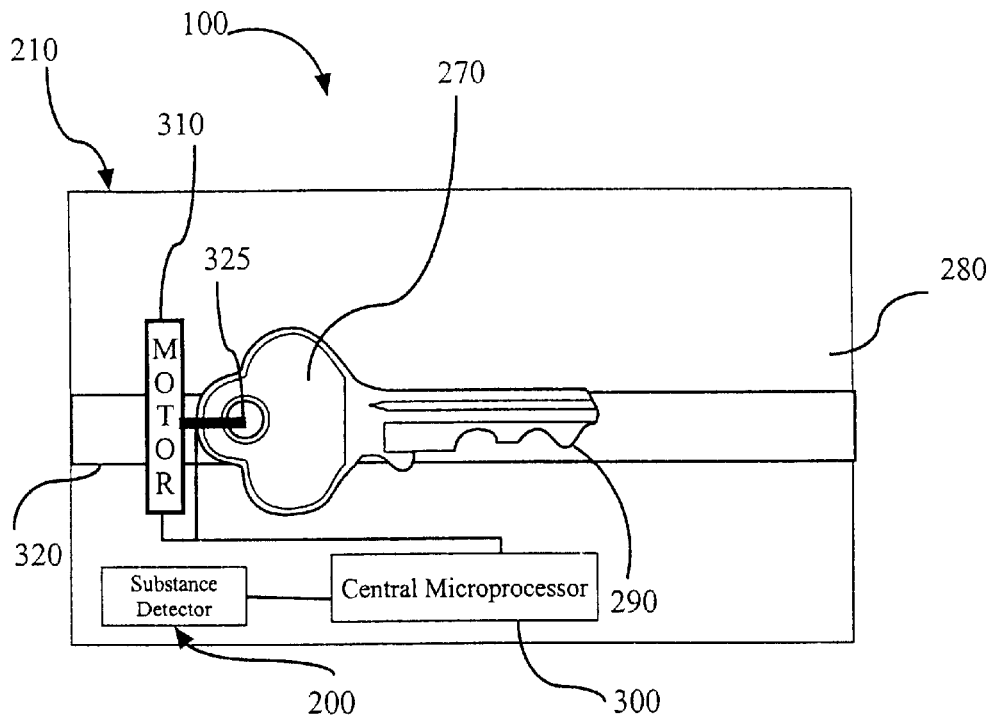
FIG. 4A illustrates one example of the system in FIG. 1 in which a key is disabled in accordance with the inventive arrangements.
Figure 4B:
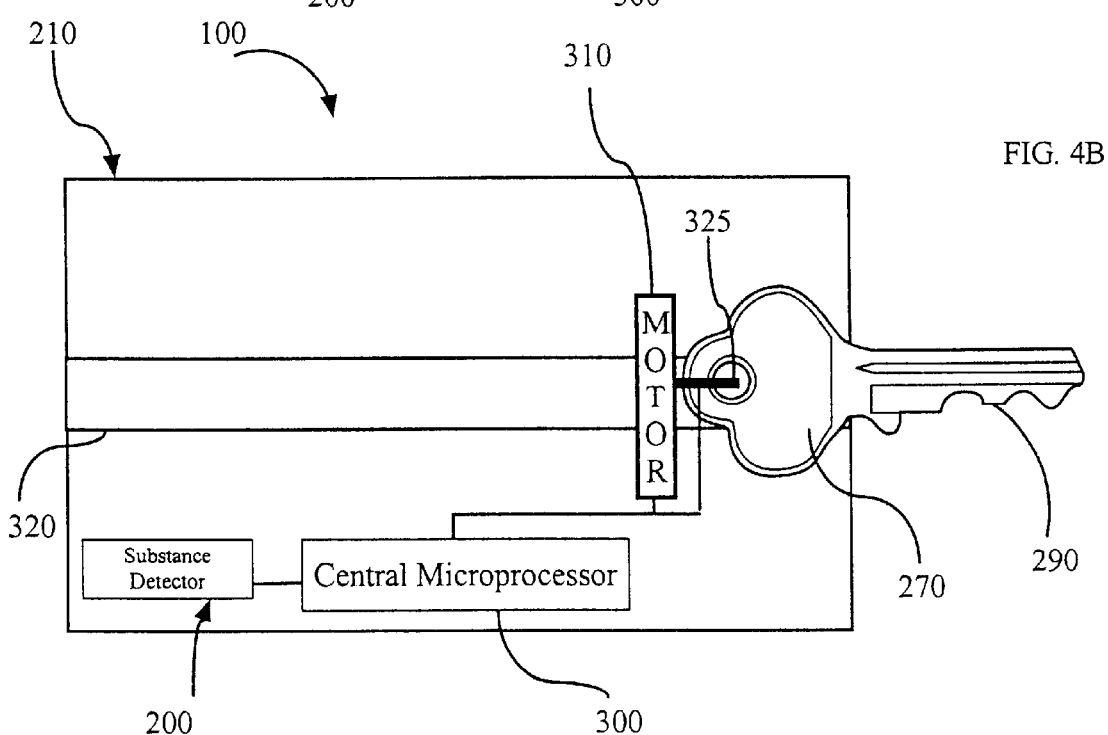
FIG. 4B illustrates one example of the system of FIG. 2 in which a key is enabled in accordance with the inventive arrangements.

Referring to FIG. 4A and FIG. 4B, one embodiment of the blocking device 210 in accordance with the inventive arrangements is shown. In this embodiment, the blocking device 210 can include the substance detector 200, the central microprocessor 300, one or more motors 310, one or more tracks 320, which can run substantially along the length of the blocking device 210, and a coupling mechanism 325. The substance detector 200, the motor 310, and the coupling mechanism 325 can be electrically coupled to the central microprocessor 300. Additionally, the key 270 can be slidably engaged to one or more of the tracks 320.

The blocking device 210 can disable the key 270 when a user places at least a portion of the key 270 in the receiving portion 280. This process can force a portion of the key 270 to contact the coupling mechanism 325. Sensing contact with the key 270, the coupling mechanism 325 can secure the key 270, as shown in FIG. 4A and FIG. 4B. The coupling mechanism 325 can be, for example, a solenoid operated snap or clamp; however, the invention is not limited in this regard as any suitable coupling mechanism 325 can be used. Once the coupling mechanism 325 has secured the key 270, the central microprocessor 300 can signal the motor 310 to impart motion to the key 270. The motor 310 can force the key 270 to retract along the tracks 320 until access to at least a portion of the functional region 290 of the key 270 is prevented. This process can disable the key 270 as shown in FIG. 4A.

In operation, if the substance detector 200 determines that the user's substance level is within a predetermined range, the substance detector 200 can signal the central microprocessor 300. For the blocking device 210 to enable the key 270, the central microprocessor 300 can signal the motor 310 to impart motion to the key 270. As a result, the motor 310 can force the key 270 to slide along the tracks 320 until at least a portion of the functional region 290 of the key 270 is exposed, as shown in FIG. 4B. Additionally, the central microprocessor 300 can instruct the coupling mechanism 325 to release the key 270. This process can enable the key 270.

As noted earlier, the alarm 220 can be considered part of the blocking device 210 and in communication with the substance detector 200. Referring to FIGS. 1 and 2, the alarm 220 can include an audible alarm 230 and visual alarm 240. In operation, the alarm 220 can receive a signal from the substance detector 200 through the central microprocessor 300 if a user's substance level is outside a predetermined range. In response, the audible alarm 230 can broadcast an alarm sound through a speaker (not shown), while the visual alarm 210 can produce a flashing or constant light through a small lamp or a light emitting diode (not shown). It should be noted, however, that the invention is not limited in this regard as any other suitable alarms may be used with the invention.

As discussed earlier and referring to FIGS. 1, 2, and 3, the user interface 250 can be considered part of the blocking device 210 and in communication with the substance detector 200. The substance detector 200 can send signals to the user interface 250 through the central microprocessor 300. The central microprocessor 300 can instruct the user interface 250 to display information regarding the analysis performed by the substance detector 200. For example, if the substance detector is measuring a user's blood alcohol content, the user interface 250 can display the results of the measurement. The user interface 250 can also be used to display instructions to the user, such as when to provide a breath sample.

Figure 5:
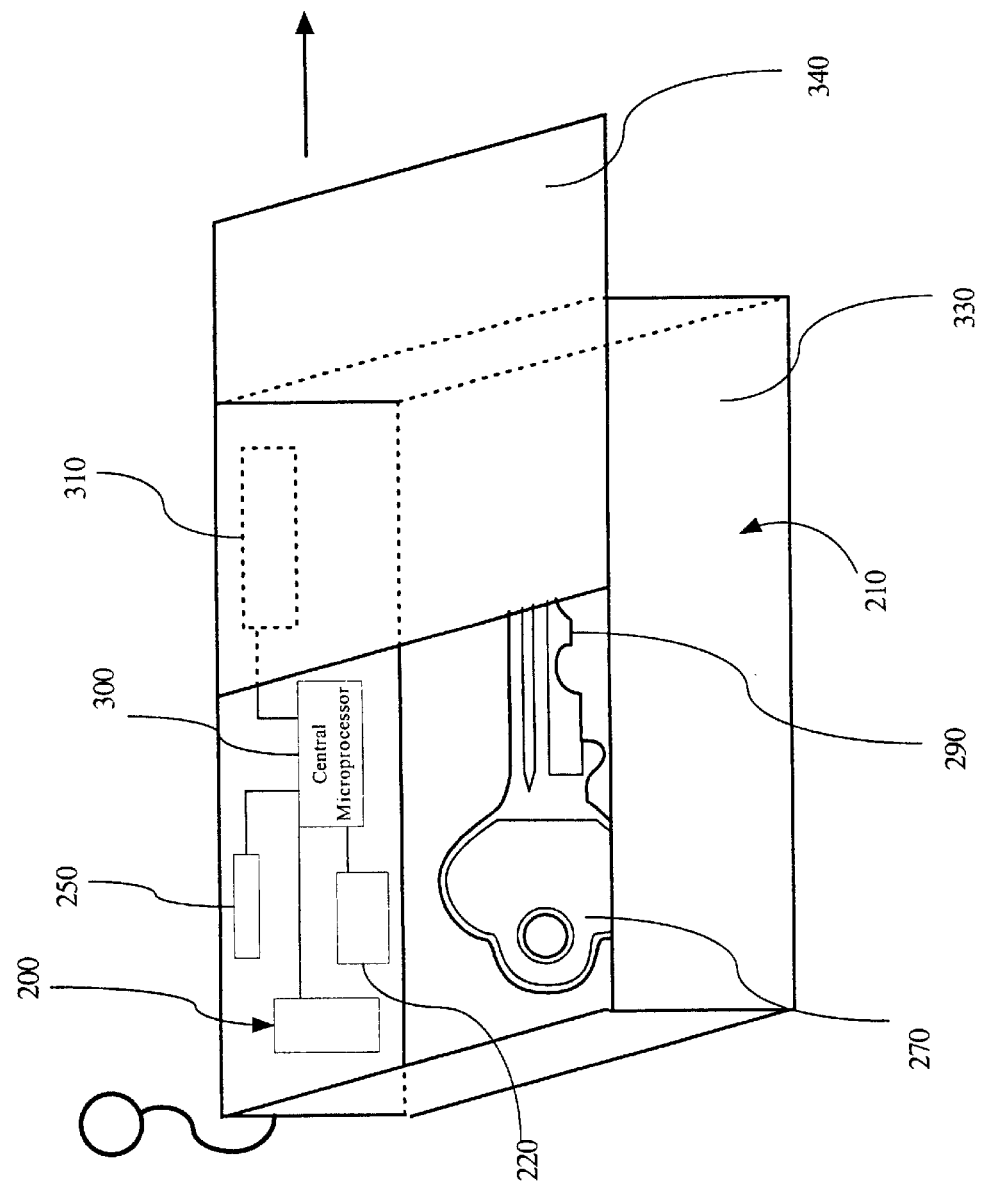
FIG. 5 illustrates a perspective view of an example of the systems of FIGS. 1 and 2 in accordance with the inventive arrangements.

In another embodiment and as illustrated in FIG. 5, the blocking device 210 can include a compartment 330 and a cover 340 slidably coupled to the compartment 330. The system 100 can include the substance detector 200 and the blocking device 210, which can include the alarm 220, the motor 310, and the user interface 250, which can all be electrically coupled to the central microprocessor 300. In this particular embodiment, the blocking device 210 can disable the key 270 when a user places at least a portion of the functional region 290 of the key 270 into the compartment 330 and secures the key 270 by sliding the cover 340 to close the compartment 330. The cover 340 can be slid by the user or through motion imparted by the motor 310 once the key 270 is placed into the compartment 330. The compartment 330 with a closed cover 340 disables the key 270 because the user cannot access the key 270.

In operation, if the user's substance level is within a predetermined range, the substance detector 200 can signal the central microprocessor 300. For the blocking device 210 to enable the key 270, the central microprocessor 300 can signal the motor 310 to impart motion to the cover 340, which can cause the cover 340 to slide along the compartment 330. The key 270 can be enabled when the cover 340 slides enough to expose at least a portion of the functional region 290 of the key 270. This process can provide a user with access to the key 270.

Figure 6:
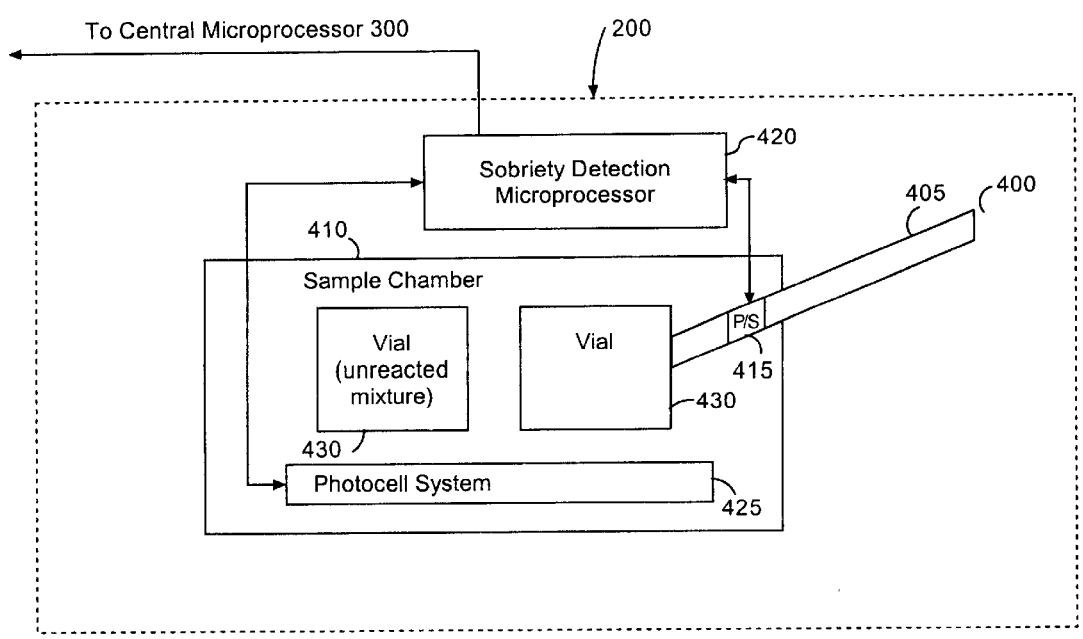
FIG. 6 illustrates a substance detector in accordance with the inventive arrangements.

Referring to FIG. 6, an example of a substance detector 200 in accordance with the inventive arrangements is shown. In this example, the substance detector 200 can be a breath alcohol test device commonly referred to as a Breathalyzer. Such a device relies on chemical reactions involving alcohol to determine a users blood alcohol content. The substance detector 200 can include a mouthpiece 400, a tube 405, a sample chamber 410, a pressure switch 415, a sobriety detection microprocessor 420, a photocell system 425 and a plurality of vials 430 for storing the chemicals used in the breath analysis. The tube 405 can be attached to the mouthpiece 400 and can channel exhaled air from a user to the sample chamber 410. To prevent the spread of communicable diseases and to ensure overall sanitary conditions, the mouthpiece 400 can be a disposable elongated tube that can be conveniently discarded following its use, such as a plastic straw.

Additionally, the photocell system 425 and the vials 430 can be contained within the sample chamber 410, and the pressure switch 415 can be located within the tube 405. In one arrangement, the pressure switch 415 can be designed to electrically close when the air pressure at its input reaches a predetermined threshold. The sobriety detection microprocessor 420 can control the operation of the photocell system 425 and can receive signals from the pressure switch 415. The sobriety detection microprocessor 420 can also receive signals from and transmit signals to the central microprocessor 300 (see FIG. 3A).

As the user's breath passes through the tube 405, the air pressure at the input of the pressure switch 415 will increase. If the pressure reaches the predetermined threshold, the pressure switch 415 can electrically close thereby signaling the sobriety detection microprocessor 420 that an acceptable breath sample has been received. If the sobriety detection microprocessor 420 receives no signal from the pressure switch 415 within a predetermined amount of time, the sobriety detection microprocessor 420 can signal the central microprocessor 300. In response, the central microprocessor 300 can prompt the user interface 250 to request the user to provide another breath sample. After the sobriety detection microprocessor 420 receives the signal from the pressure switch 415, the sobriety detection microprocessor 420 can signal the photocell system 425.

The breath sample can enter the sample chamber 410 and can be bubbled through a chemical mixture in at least one of the vials 430 thereby causing a chemical reaction. As an example, the breath sample can be bubbled through a mixture including sulfuric acid, potassium dichromate, silver nitrate and water. By-products of this reaction include chromium sulfate, potassium sulfate and acetic acid. During this reaction, reddish-orange dichromate ions change color to the green chromium ions when they react with alcohol present in the breath sample. The degree of this color change is directly related to the level of alcohol in the expelled air.

The photocell system 425 can compare the vial 430 containing the reacted mixture to a vial 430 containing an unreacted mixture. Based on the difference in color between the two mixtures, the photocell system 425 can generate an electrical signal and can transmit the signal to the sobriety detection microprocessor 420. The sobriety detection microprocessor 420 can produce a blood alcohol content reading based on the electrical signal and can forward the reading to the central microprocessor 300.

Those of ordinary skill in the art; however, will appreciate that the substance detector 200 can include different components and can utilize different methods to detect the presence and concentration of a variety of substances ingested by a user. For example, the substance detector 200 can employ infrared spectroscopy, commonly used in Intoxilyzers, to detect a substance ingested by a user. Therefore, the example above is only illustrative, and the invention is not limited to such a substance detector 200, as any substance detector 200 may be used.

Figure 7:
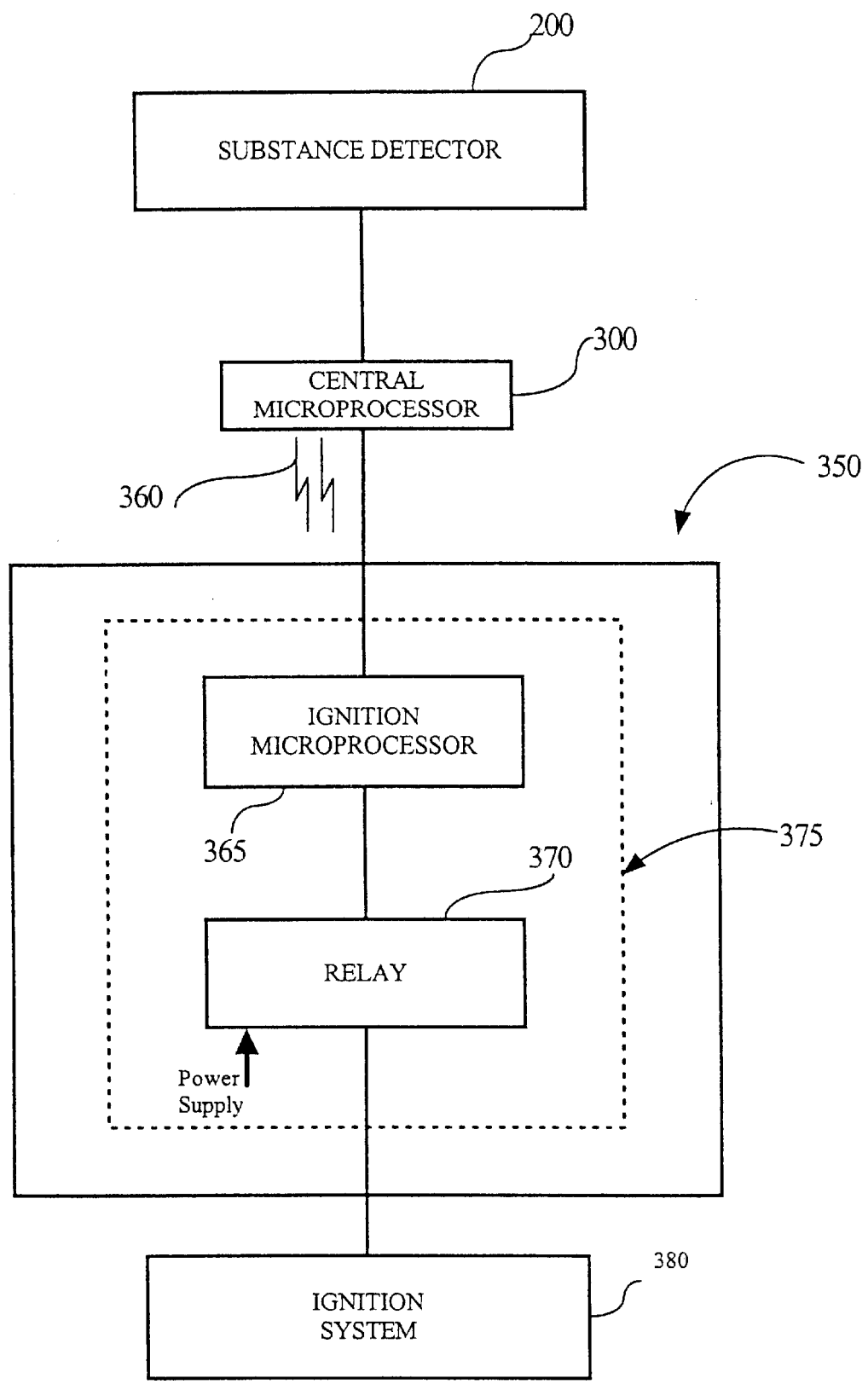
FIG. 7 illustrates an ignition disabling device in accordance with the inventive arrangements.

Turning to FIG. 7, an example of an ignition disabling device 350 in accordance with the inventive arrangements is shown. The ignition disabling device 350 can include an ignition microprocessor 365 and a relay 370. The relay 370 can be coupled to a power supply and can switchably control the transmission of power to an ignition system 380. Thus, the ignition microprocessor 365 and the relay 370 can form a circuit 375 that can supply power to the ignition system 380. As an example, the ignition disabling device 350 can be part of a vehicle (not shown) and the ignition system 380 can be a vehicle ignition system. It would be obvious to one skilled in the art that the ignition disabling device 350 can be connected to a variety of components, such as a spark plug. The ignition microprocessor 365 can be in communication with the central microprocessor 300 via control and data interfaces. In another arrangement, the ignition microprocessor 365 can include suitable circuitry to permit it to communicate with the central microprocessor 300 over the wireless communication link 360. The ignition microprocessor 365 can control the switchable relay 370 to open or close the circuit 375 based on signals received from the central microprocessor 300.

For example, if the level of the substance measured by the substance detector 200 is within the predetermined range (indicating that the user is not impaired), the central microprocessor 300 can signal the ignition microprocessor 365. In response, the ignition microprocessor 365 can instruct the relay 370 to close the circuit 375, thereby enabling the ignition system 380. Conversely, if the level of the substance measured by the substance detector is outside a predetermined range (indicating that the user is impaired), the central microprocessor 300 can signal the ignition microprocessor 365. After receiving a signal from the central microprocessor 300, the ignition microprocessor 365 can instruct the relay 370 to open the circuit 375, which disables the ignition system 380 and prevents the impaired user from operating the vehicle.

Alternatively, the circuit 375 can contain a default position in which the relay 370 opens the circuit 375 once the ignition system 380 is shut off. Thus, the ignition system 380 may be previously disabled, and the ignition disabling device 350 can enable the ignition system 380 upon receiving an authorizing signal from the central microprocessor 300. The authorizing signal can be transmitted if the level of the substance measured by the substance detector 200 is within the predetermined range.

Figure 8A:
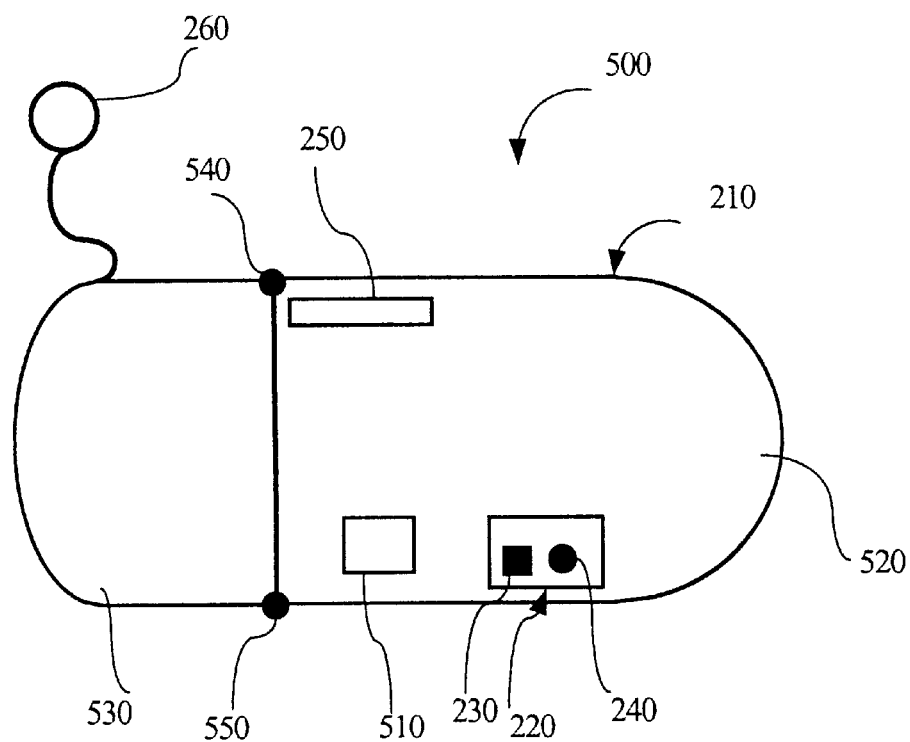
FIG. 8A illustrates a key system for preventing access to a secure area or a vehicle in accordance with the inventive arrangements.
Figure 8B:
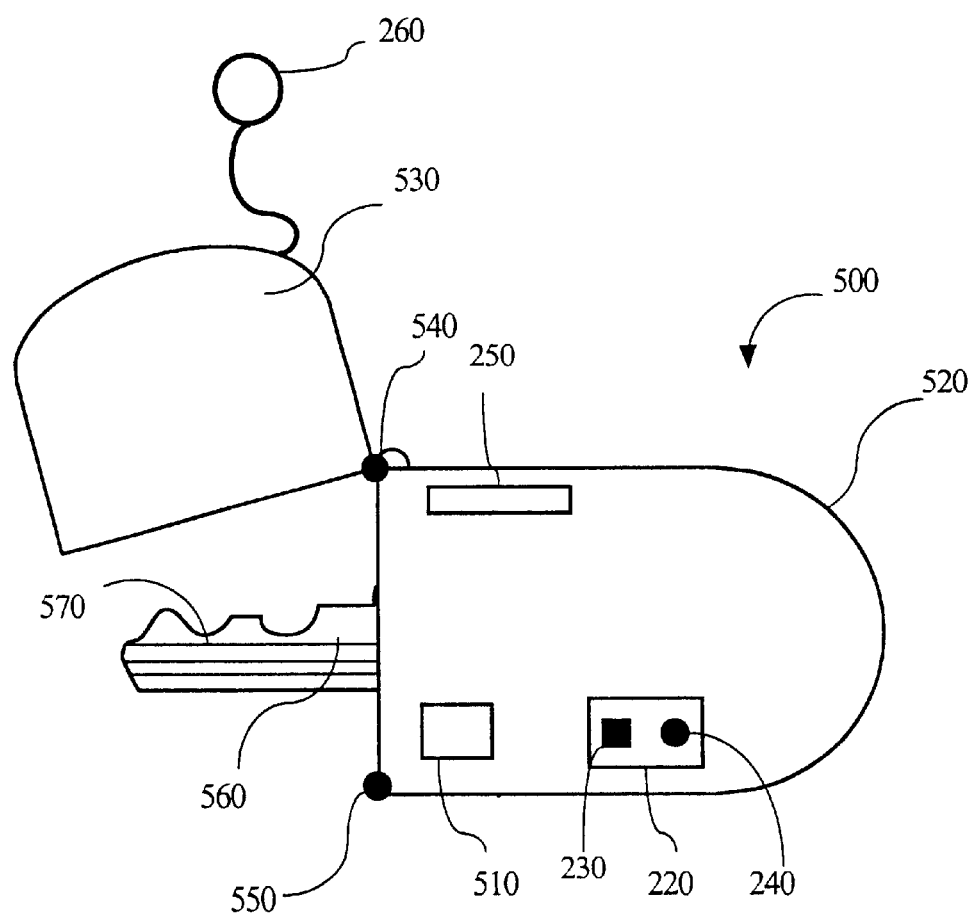
FIG. 8B illustrates a key system for preventing access to a secure area or a vehicle with an enabled key in accordance with the inventive arrangements.

Referring to FIGS. 8A and 8B, a key system 500 for restricting access to a secure area or vehicle is illustrated. Similar to the system described in relation to FIGS. 1 and 2, the key system 500 can include a blocking device 210 and a key 560 having a functional region 570. The key 560 can be a conventional key, a key having a magnetic element encoded with identifying information or a key having a biometric identifier. The blocking device can include an alarm 220, a user interface 250, and a key holder 260. Additionally, the blocking device 210 can include a communication element 510, a receiving portion 520, a securing portion 530, a hinge 540 for hingeably coupling the securing portion 530 to the receiving portion 520 and a lock 550. The lock 550 can detachably secure the securing portion 530 to the receiving portion 520. The hinge 540 can permit the securing portion 530 to swing towards or away from the receiving portion 520 in accordance with a predetermined range.

Figure 8C:
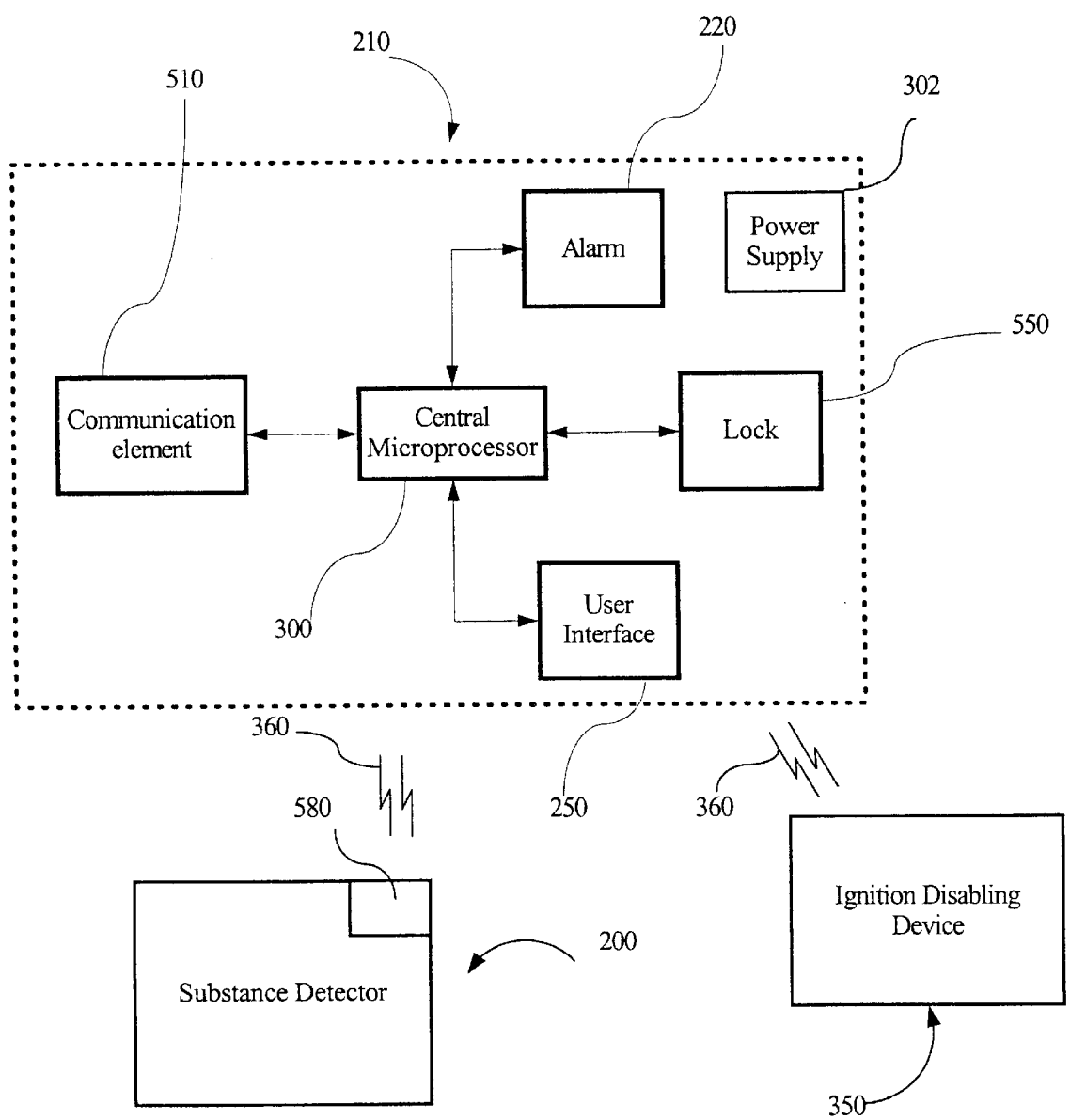
FIG. 8C illustrates a block diagram of several components of the system of FIGS. 8A and 8B in accordance with the inventive arrangements.

As shown in FIG. 8C, the blocking device 210 can further include a central microprocessor 300 and power supply 302. The central microprocessor 300 can control the operation of the alarm 220, the user interface 250, the communication element 510 and the lock 550. As also shown in FIG. 8C, control and data interfaces can be provided to facilitate this control. The central microprocessor 300 can also include suitable software or firmware to perform operations in accordance with the inventive arrangements.

The key system 500 of FIGS. 8A–8C can also include a substance detector 200 that can detect the level of at least one substance ingested by a key operator and ignition disabling device 350. A suitable example of the substance detector 200 is the device described in relation to FIG. 6. Similarly, a suitable example of the ignition disabling device 350 is the device described in relation to FIG. 7. In this embodiment, the substance detector 200 can include a transmitter 580 for transmitting control signals to the communications element 510. As an example, the transmitter 580 can transmit the control signals over a wireless communications link 360. Of course, the invention is not limited in this regard, as the transmitter 580 can also transmit the control signals to the communications element 510 over a hard-wired connection. In addition, the invention is not limited to this particular substance detector 200, as any other device suitable for detecting substances in a user's body can be employed in this arrangement.

The transmitted control signals can be indication signals that provide information concerning measurements taken by the substance detector 200. In addition, the communication element 510 can be any receiver capable of receiving control signals from the transmitter 580, either over the wireless communications link 360 or a hard-wired connection. The communication element 510 can forward the control signals to the central microprocessor 300 when the communication element 510 receives such signals from the transmitter 580. Based on the control signals received from the communications element 510, the central microprocessor 300 can perform one or more predetermined functions, several of which will be described below.

In operation, referring to FIG. 8B, a user can insert at least a portion of the key 560 into the receiving portion 520 of the blocking device 210. The user can force the securing portion 530 of the blocking device 210 towards the receiving portion until the lock 550 secures the securing portion 530 to the receiving portion 520, as shown in FIG. 8A. At this point, the blocking device 210 has disabled the key 560. Thus, the blocking device 210 can disable the key 560 when at least a portion of the key 560 is placed in the receiving portion 520 such that the functional region 570 of the key 560 is inaccessible.

Referring to FIG. 8C, to access the key 560, a user can provide, for example, a breath sample to the substance detector 200, which can analyze the sample to determine the level of a substance in the user's body is within a predetermined range. Similar to the embodiment presented in FIGS. 1 and 2 and as an example, the substance detector 200 can determine the user's blood alcohol content and compare this measurement to the legal limit of a particular jurisdiction. If the substance detector 200 determines that the level of the substance is within the predetermined range, the substance detector 200 can transmit a first control signal to the communication element 510 via the transmitter 580 and the wireless communication link 360.

The first control signal can be used to signal the central microprocessor 300 (through the communication element 510) that the user may have access to the key 560. As an option, the central microprocessor 300 can signal the user interface 250, which can display the measurement generated by the substance detector's 200 analysis. In addition the central microprocessor 300 can signal the ignition disabling device 350 over the wireless communication link 360 to enable an ignition system (not shown).

In response to the first control signal, the central microprocessor 300 can signal the lock 550. As shown in FIG. 8B, the lock 550 can release the securing portion 530 of the blocking device 210 from the receiving portion 520, and a user can pull the securing portion 530 away from the receiving portion 520, at least as far as the range set by the hinge 540 will permit. Here, the key 560 is enabled because at least a portion of its functional region 570 is exposed.

Referring back to FIG. 8C, if the substance detector 200 determines that the level of the substance in the user's body is outside the predetermined range, the substance detector 200 can transmit a second control signal through the transmitter 580 to the communication element 510. The communication element 510 can forward this second control signal to the central microprocessor 300. Subsequently, the central microprocessor 300 can signal the user interface 250 and the alarm 220. The user interface 250 can display the reading generated by the substance detector 200, and the alarm 220 can generate an audibly-based alarm through the audible alarm 230 or a visually-based alarm through the visual alarm 240. In addition, the ignition system can remain disabled or, alternatively, the central microprocessor 300 can signal the ignition disabling device 350 to disable the ignition system.

If the user has provided an inadequate sample for analysis, e.g., the user did not blow hard enough to permit the substance detector 200 to analyze his or her breath, the substance detector 200 can signal the communication element 510. In turn, the communication element 510 can signal the central microprocessor 300, which can signal the user interface 250. The user interface 250 can display instructions requesting that the user provide another breath for analysis.

Figure 9:
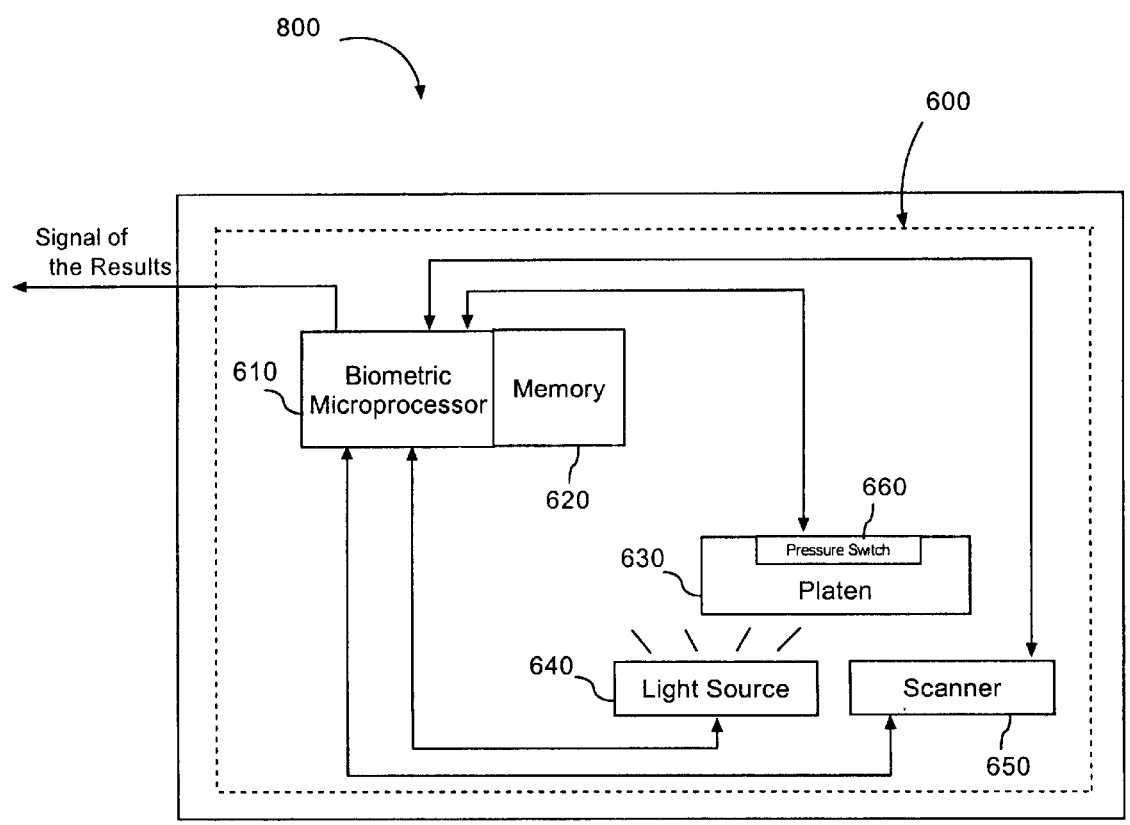
FIG. 9 illustrates a key having a biometric identifier for use in a key system for preventing access to a secure area and a vehicle in accordance with the inventive arrangements.
Figure 10:
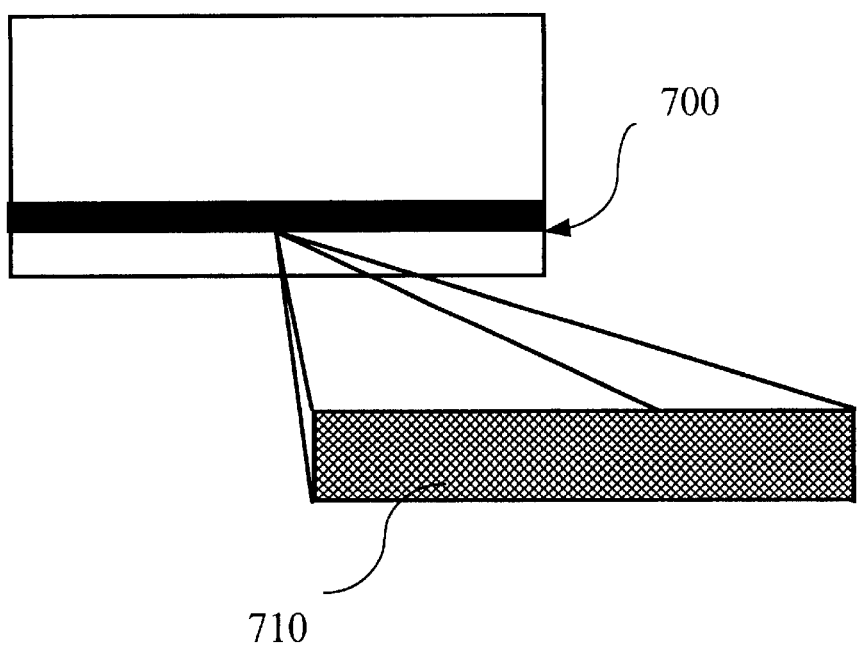
FIG. 10 illustrates a key having a magnetic element encoded with identifying information for use in a key system for preventing access to a secure area and a vehicle in accordance with the inventive arrangements.

In one arrangement, for purposes of additional security, the key 560 can include at least one of a biometric identifier 600 and a magnetic element 700 encoded with identifying information as shown in FIGS. 9 and 10. Examples of a key having a biometric identifier and a magnetic element encoded with identifying information will now be presented.

Referring to FIG. 9, one example of a key 800 having a biometric identifier 600 in accordance with the inventive arrangements is shown. In this example, the biometric identifier 600 can generate digitized images of fingerprints, store the images and compare them with subsequently acquired fingerprint images. The biometric identifier 600 can include a biometric microprocessor 610 containing memory 620, of which at least a portion can be non-volatile, a platen 630, a light source 640, a fingerprint scanner 650 and a pressure switch 660. Here, the platen 630 can be considered a functional region of the key 800.

The light source 640 can direct light towards the platen 630 and can be, for example, a light emitting diode. The platen 630 can also be transparent to the wavelength of the emitted light and can contain the pressure switch 660, which can be electrically coupled to the biometric microprocessor 610. The pressure switch 660 can detect when a user has placed his or her finger on the platen 630 and can signal the biometric microprocessor 610. In addition, the biometric microprocessor 610 can control the operation of the light source 640 and the fingerprint scanner 650. The fingerprint scanner 650 can be any biometric device capable of scanning fingerprint images and, if necessary, converting these images into digitized images.

In operation, a user can place his or her finger on the platen 630, and the pressure switch 660 can signal the biometric microprocessor 610. The biometric microprocessor 610 can signal the fingerprint scanner 650 and the light source 640, which can emit the light needed to create a scanned image of the user fingerprint. The light can pass through the platen 630 and can strike the user's finger, which can cause the light to be reflected to the fingerprint scanner 650.

From the reflected light, the fingerprint scanner 650 can generate a scanned image of the user's fingerprint and can convert the image into a digital signal. The fingerprint scanner 650 can forward this signal to the biometric microprocessor 610, which can store the digitized image in memory 620. The biometric microprocessor 610 can compare subsequent digitized images captured in accordance with the above description with the digitized image stored in memory 620. The biometric microprocessor 610 can signal the results of the comparison to any suitable securing device that can authorize the use of the key 800.

Turning to FIG. 10, one example of a key 900 having a magnetic element 700 encoded with identifying information in accordance with the inventive arrangements is shown. In this example, the magnetic element 700 can be considered a functional region of the key 900. The magnetic element 700 can contain a multitude of particles 710 which can be embedded in a layer, as shown in FIG. 10. This configuration is commonly referred to as a magstripe. As is known in the art, the layer can be encoded with information by magnetizing the individual particles 710 with a north pole or a south pole alignment thereby creating a pattern corresponding to such information. The encoded information on the magnetic element 700 can be read by a device configured to extract and decode the information, which can be used to identify the user of the key 900. Examples of identifying information can include the name, address, social security number, and account number of the user. Those of ordinary skill in the art, however, will appreciate that other suitable forms of information can be encoded on the magnetic element 700.

Although the present invention has been described in conjunction with the embodiments disclosed herein, it should be understood that the foregoing description is intended to illustrate and not limit the scope of the invention as defined by the claims.

What is claimed is:

1. A system for preventing access to a vehicle, comprising:

a substance detector configured to detect a level of at least one substance ingested by a user; and a blocking device in communication with said substance detector;

wherein said blocking device disables the operability of at least one key; wherein said blocking device enables the operability of the key when the level of the substance is measured by said substance detector to be within a predetermined range; and wherein said blocking device enables the key by exposing at least a portion of a functional region of the key.

2. The system of claim 1, wherein said blocking device comprises a receiving portion.

3. The system of claim 2, wherein said blocking device disables the key when at least a portion of the key is placed in said receiving portion.

4. The system of claim 1, wherein said blocking device includes at least one track;

wherein the key is slidably engaged to said track and at least one motor for imparting motion to the key such that the key slides along said track until at least a portion of the functional region of the key is exposed.

5. The system of claim 1, wherein said blocking device comprises a cover and a compartment;

wherein said cover is slidably engaged to said compartment, said blocking device further comprising at least one motor for imparting motion to said cover such that said cover slides along said compartment until at least a portion of the functional region of the key is exposed.

6. The system of claim 1, wherein said substance detector detects the level of the substance by analyzing a breath sample provided by a user.

7. The system of claim 6, wherein said substance detector analyzes the breath sample by measuring for blood alcohol content.

8. The system of claim 1, further comprising an alarm.

9. The system of claim 8, wherein said alarm comprises at least one of a visual alarm and an audible alarm.

10. The system of claim 8, wherein said alarm system activates when said substance detector determines that the level of the substance is outside said predetermined range.

11. The system of claim 1, further comprising a user interface.

12. The system of claim 1, further comprising a key holder for supporting a plurality of keys.

13. The system of claim 1, wherein the key includes at least one of a magnetic element encoded with identifying information and a biometric identifier.

14. The system of claim 1, further comprising an ignition disabling device, wherein said ignition disabling device enables an ignition system when the level of the substance is measured by said substance detector to be within said predetermined range.

15. A key system for restricting access to a secure area or a vehicle, comprising:

at least one key;

a blocking device having a communication element;

wherein said blocking device disables the operability of said key;

wherein said blocking device enables the operability of said key when said communication element receives a first control signal;

wherein said blocking device further comprises a receiving portion; and wherein said blocking device disables said key when at least a portion of said key is placed in said receiving portion, such that a functional region of said key is inaccessible.

16. The key system of claim 15, wherein said blocking device further comprises a securing portion;
wherein said securing portion is hingably coupled to said receiving portion.

17. The key system of claim 16, wherein said blocking device further comprises a lock for detachably fastening said securing portion to said receiving portion.

18. The key system of claim 15, wherein a substance detector configured to detect a level of at least one substance ingested by a key operator transmits the first control signal to said communication element.

19. The key system of claim 18, wherein the substance detector transmits the first control signal when the substance detector determines that the substance level is within a predetermined range.

20. The key system of claim 15, further comprising an alarm; wherein said alarm comprises at least one of a visual alarm and an audible alarm.

21. The key system of claim 20, wherein said alarm activates when said communication element receives a second control signal.

22. The key system of claim 15, further comprising a user interface.

23. The key system of claim 15, further comprising a key holder for supporting a plurality of keys.

24. The key system of claim 15, wherein said key includes at least one of a magnetic element encoded with identifying information and a biometric identifier.

25. The key system of claim 19, wherein an ignition disabling device enables an ignition system when the substance detector determines that the substance level is within said predetermined range.

* * * * *